No. 714,813. Patented Dec. 2, 1902.
C. T. MASON.
JOINT FOR TELEPHONE TRANSMITTER ARMS.
(Application filed June 3, 1902.)

(No Model.)

Witnesses
C. H. Walker
Geo. E. Tew

Inventor
Charles Thomas Mason
By Milo B. Stevens & Co.
Attorneys

THE NORRIS PETERS CO., PHOTO-LITHO., WASHINGTON, D. C.

UNITED STATES PATENT OFFICE.

CHARLES THOMAS MASON, OF SUMTER, SOUTH CAROLINA.

JOINT FOR TELEPHONE-TRANSMITTER ARMS.

SPECIFICATION forming part of Letters Patent No. 714,813, dated December 2, 1902.

Application filed June 3, 1902. Serial No. 110,088. (No model.)

*To all whom it may concern:*

Be it known that I, CHARLES THOMAS MASON, a citizen of the United States, residing at Sumter, in the county of Sumter and State of South Carolina, have invented certain new and useful Improvements in Joints for Telephone-Transmitter Arms; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to joints for telephone-transmitter arms, meaning thereby the arm by which the transmitter and mouth-piece are adjustably supported on the base.

The object of the invention is to form a joint the friction of which may be adjusted by a thumb-nut, having the advantage over existing joints that a bearing-surface does not have to be ground and finished upon the arm or the ears of the base. The bearings of my joint may be separately formed or turned out by automatic machinery from steel, avoiding the grinding and finishing of bearing-surfaces on the cast-iron parts.

A further object of the invention is to provide a cheaper and more durable and efficient friction-joint than has heretofore been constructed which may be adjusted without the use of tools.

The invention involves a cone-bearing which, however, is quite different from an existing joint in which the arm is pivoted upon cone-pointed screws held by binding-nuts, which construction requires the use of a wrench to loosen the nuts and a screw-driver to move the screws every time the joint is adjusted.

Figure 1:
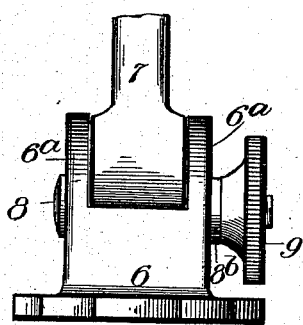
Figure 2:
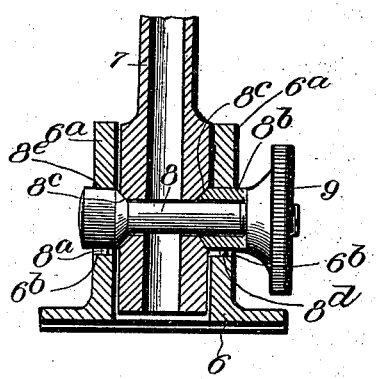
Figure 3:
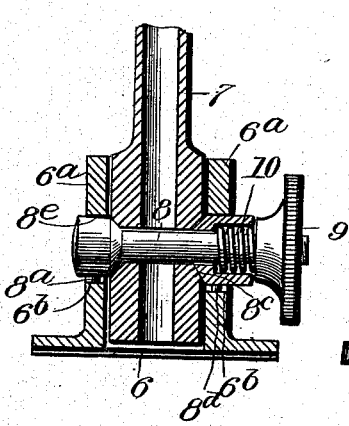
Figure 4:
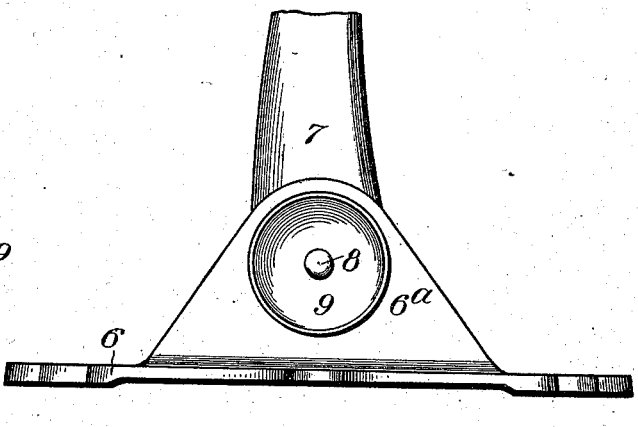

In the accompanying drawings, Figure 1 is an end elevation of the joint, part of the arm being broken away. Fig. 2 is a central vertical section through the joint. Fig. 3 is a similar section of a modification having a tension-spring. Fig. 4 is a side elevation.

Referring specifically to the drawings, 6 indicates the base, and $6^a$ the ears thereon, between which the arm 7 is pivoted. The arm may be solid or hollow, as desired. I have shown the same hollow.

The pivot-pin is indicated at 8, having at one end a head fitting snugly through the hole in one of the ears. The head has a small pin $8^a$, which projects into a notch $6^b$ in the ear to prevent the pin turning when the parts are assembled. A sleeve $8^b$ slides loosely on the pin, and this sleeve and the head of the pin have bearing-cones $8^c$, which frictionally engage corresponding countersunk holes in the arm. The sleeve $8^b$ has also a pin $8^d$ in a notch $6^b$ to prevent the sleeve from turning. The outer end of the pin is threaded to receive a thumb-nut 9, by which the friction contact is adjusted. It will be understood that this contact is sufficient to retain the arm in the position in which it is set, yet not so great as to prevent its movement. The thumb-nut bears against the cone-sleeve $8^b$, and movement thereof affects the friction in an obvious manner. The head of the pin is slightly spread or expanded, as at $8^e$, so that it may not be drawn through the ear.

In the modification shown in Fig. 3 the cone-sleeve is recessed to form a seat for a spring 10, coiled around the pin and bearing in compression against the thumb-nut. This provides a uniform tension at all times. If desired, the spring may be removed to effect the thumb-nut tension.

It will be seen that the sides of the arm do not contact with the ears. Therefore the surfaces can be left unfinished, whereby the expense of grinding incident to the common joint is avoided. The arm is supported by the cone-bearings, and any necessary adjustment may be effected without the use of any tools. Furthermore, the bearing-cones cannot turn and will not work loose.

What I claim as my invention is—

1. In a joint for telephone-transmitter arms, the combination with a base and the arm, of a pivot-pin supported by the base and extending through the arm and having adjustable bearing-cones between which the arm is held in friction, out of contact with the base.

2. In a joint for telephone-transmitter arms, the combination with a support and the arm, of a pivot-pin carried by the support and having adjustable, spring-supported, bearing-cones thereon between which the arm is held in friction.

3. In a joint for telephone-transmitter arms, the combination with the base and ears, and the arm, of a pivot-pin extending through the ears and arm, bearing-cones on the pin, one of which is slidable, between which the arm is held in friction, and a binding-nut on the pin adjacent the sliding cone, to adjust the friction.

4. In a joint for telephone-transmitter arms, the combination with the base, and a threaded pivot-pin supported thereby having a cone-head, of a cone-sleeve slidable on the pin, an arm having countersinks to receive the cones and held in friction therebetween, out of contact with the base, and a binding-nut on the pin outside the sleeve, to adjust the friction.

In testimony whereof I affix my signature in presence of two witnesses.

CHARLES THOMAS MASON.

Witnesses:
C. G. ROWLAND,
F. C. MANNING.